(12) United States Patent
Buezis et al.

(10) Patent No.: US 7,741,941 B2
(45) Date of Patent: Jun. 22, 2010

(54) DUAL ARMATURE SOLENOID VALVE ASSEMBLY

(75) Inventors: James G. Buezis, Plymouth, MN (US); Glenn R. Bergum, St. Anthony, MN (US); Douglas D. Bird, Little Canada, MN (US); Timothy J. Smith, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 255 days.

(21) Appl. No.: 11/565,425

(22) Filed: Nov. 30, 2006

(65) Prior Publication Data

US 2008/0129432 A1 Jun. 5, 2008

(51) Int. Cl.
*H01F 7/00* (2006.01)
*H01F 3/12* (2006.01)

(52) U.S. Cl. ............... 335/265; 335/220; 335/236; 335/253; 335/273; 335/274

(58) Field of Classification Search ......... 335/220–261, 335/265–267, 273–274
See application file for complete search history.

(56) References Cited

U.S. PATENT DOCUMENTS

| 731,741 | A | * | 6/1903 | Baxter, Jr. .................. 335/265 |
| 2,373,256 | A | | 4/1945 | Miller |
| 2,965,954 | A | | 10/1960 | Baker |
| 3,704,462 | A | * | 11/1972 | Pihl ....................... 340/815.63 |
| 4,200,972 | A | | 5/1980 | Katchka et al. |
| 4,546,955 | A | | 10/1985 | Beyer et al. |
| 4,624,282 | A | | 11/1986 | Fargo |
| 4,760,694 | A | | 8/1988 | Gillon, Jr. |
| 4,778,227 | A | | 10/1988 | Bayliss |
| 5,004,162 | A | | 4/1991 | Stettner et al. |
| 5,218,996 | A | | 6/1993 | Schmitt-Matzon |
| 5,353,991 | A | | 10/1994 | De Nagel et al. |
| 5,435,343 | A | * | 7/1995 | Buezis ....................... 137/489 |
| 5,717,372 | A | | 2/1998 | Cannon et al. |
| 5,896,076 | A | * | 4/1999 | van Namen ................ 335/229 |
| 6,047,718 | A | | 4/2000 | Konsky et al. |
| 6,510,841 | B1 | | 1/2003 | Stier |
| 6,572,077 | B1 | | 6/2003 | Worner |
| 6,719,265 | B2 | | 4/2004 | Kloda et al. |
| 6,748,977 | B2 | | 6/2004 | Berto |
| 6,791,442 | B1 | * | 9/2004 | Schmidt ..................... 335/220 |

(Continued)

*Primary Examiner*—Elvin G Enad
*Assistant Examiner*—Mohamad A Musleh
(74) *Attorney, Agent, or Firm*—Crompton Seager & Tufte LLC (57) ABSTRACT

An electromagnetic valve assembly having a dual armature solenoid for controlling two valves is disclosed. In one embodiment, the solenoid may include a first pole piece, a second pole piece spaced from the first pole piece, a coil disposed about at least a portion of the first pole piece, a first armature extending laterally across the first pole piece and the second pole piece, and a second armature extending laterally across the first pole piece and the second pole piece. In one illustrative embodiment, the first armature and the second armature pivot relative to the second pole piece. In another illustrative embodiment, the first armature and the second armature pivot relative to the first pole piece. In yet another illustrative embodiment, the first armature and the second armature pivot relative to opposite pole pieces. In any case, the coil may electromagnetically actuate the first and second armatures to selectively open and/or close corresponding valves or other actuatable components.

10 Claims, 11 Drawing Sheets

U.S. PATENT DOCUMENTS

| | | |
|---|---|---|
| 6,856,222 B1 * | 2/2005 | Forck .......................... 335/265 |
| 6,955,186 B2 | 10/2005 | Kill et al. |
| 7,011,110 B1 | 3/2006 | Stark |
| 2001/0040492 A1 * | 11/2001 | Hyatt et al. .................. 335/258 |
| 2005/0184120 A1 * | 8/2005 | Terrell et al. ................... 227/8 |
| 2006/0071748 A1 * | 4/2006 | Nelson ........................ 335/220 |

* cited by examiner

DUAL ARMATURE SOLENOID VALVE ASSEMBLY

FIELD

The present invention relates generally to valves, and more particularly, to electromagnetic valve assemblies.

BACKGROUND

Valves are commonly used in conjunction with many appliances for regulating the flow of fluid or gas. In particular, gas valves are typically incorporated into gas-fired appliances to regulate the flow of gas to a combustion chamber or burner. Examples of such gas-fired appliances can include, but are not limited to, water heaters, furnaces, boilers, fireplace inserts, stoves, ovens, clothes dryers, grills, deep fryers, or any other such device where gas control is desired. In such gas-fired appliances, the gas may be ignited by a pilot flame, electronic ignition source, or other ignition source, causing combustion of the gas at the burner element producing heat for the appliance. In many cases, a gas valve either permits gas to flow, or ceases to permit gas to flow in response to a control signal from a control device such as a thermostat or other controller. In some applications, redundant gas valves are desired for increased safety.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention relates generally to valves, and more particularly, to electromagnetic valve assemblies. In one illustrative embodiment, a solenoid may include a first pole piece, a second pole piece, a first armature, a second armature, and a coil. The second pole piece may be spaced from the first pole piece, and in some embodiments, parallel or substantially parallel to the first pole piece but this is not required. The coil of the solenoid may be disposed about at least a portion of the first pole piece. The first armature may extend laterally across the first pole piece and/or the second pole piece, and may be mounted to pivot relative to the first pole piece and/or the second pole piece. Likewise, the second armature may extend laterally across the first pole piece and/or the second pole piece, and may be mounted to pivot relative to the first pole piece and/or the second pole piece. In some illustrative embodiments, the first armature may pivot or otherwise move to open and close a first valve, and the second armature may pivot or otherwise move to open and close a second valve.

In some embodiments, the solenoid may include a first spring or other biasing mechanism to bias the first armature away from the first pole piece or second pole piece. Likewise, a second spring or other biasing mechanism may be provided to bias the second armature away from the first pole piece or second pole piece. With an appropriate current applied, the coil of solenoid may produce a magnetic field that overcomes the biasing of the first spring and/or second spring to actuate the first armature and/or the second armature, and thus open and/or close the first and second valves.

BRIEF DESCRIPTION

The invention may be more completely understood in consideration of the following detailed description of various illustrative embodiments of the invention in connection with the accompanying drawings, in which.

DETAILED DESCRIPTION

The following description should be read with reference to the drawings wherein like reference numerals indicate like elements throughout the several views. The detailed description and drawings show several embodiments which are meant to be illustrative of the claimed invention.

The present invention relates generally to valves, and more particularly, to electromagnetic valve assemblies. In one illustrative embodiment, a pair of gas valves may be used to regulate gas flow to a combustion system, such as a burner in a gas-fired appliance. The pair of valves may be fluidly connected in a series arrangement, which may be useful to help provide a fail safe or redundant gas control system. In other cases, the pair of valves may be fluidly connected in a parallel arrangement, which may be useful when it is desirable to modulate or regulate the flow of a gas or other fluid. While the Figures below describe electromagnetic valve assemblies, this is not meant to be limiting. It is contemplated that the present invention may be useful to help control any suitable actuator or actuator system, as desired.

Figure 1:
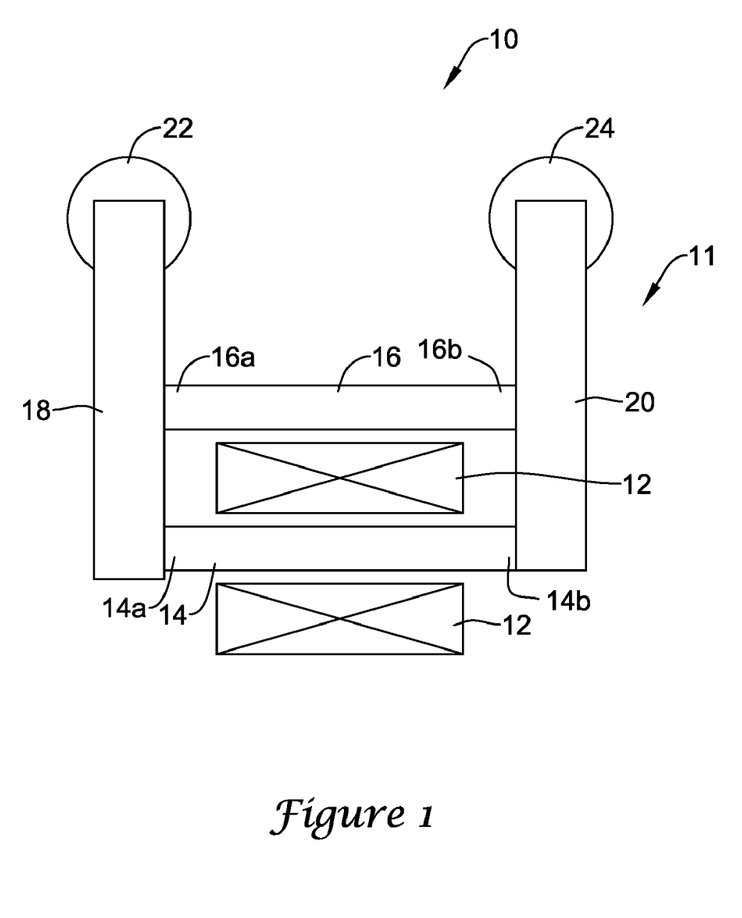
FIG. 1 is a schematic front view of an illustrative embodiment of an electromagnetic valve assembly in accordance with the present invention.

FIG. 1 is a schematic front view of an illustrative embodiment of an electromagnetic valve assembly 10 in accordance with the present invention. The illustrative electromagnetic valve assembly 10 includes a solenoid 11 that can be used to control two or more valves 22 and 24. In some cases, the solenoid 11 may be a dual armature solenoid 11 having a pair of armatures 18 and 20. In the illustrative embodiment, the pair of armatures 18 and 20 can be electromagnetically actuated using a single coil 12.

In FIG. 1, each armature 18 and 20 is configured to control the closing and opening of a corresponding valve 22 and 24, respectively. However, and as indicated above, it is contemplated that each armature 18 and 20 may be configured to control any suitable actuated element, as desired.

In the illustrative embodiment, the solenoid 11 includes a first pole piece 14, a second pole piece 16, a first armature 18, a second armature 20, and a coil 12. The first and second pole pieces 14 and 16 may be elongate members having a first end 14a and 16a, and a second end 14b and 16b, respectively. In some cases, the first and second pole pieces 14 and 16 may be positioned parallel or substantially parallel to one another, but this is not required in all embodiments. For example, it is contemplated that the first and second pole pieces 14 and 16 may be arranged in a non-parallel or in any other suitable arrangement, as desired. The first and second pole pieces 14 and 16 may include, at least in part, a ferrous metal such as nickel, iron, nickel-iron, cobalt, low carbon steel, and/or any other suitable ferrous metal or metal composite, as desired.

In the illustrative embodiment shown in FIG. 1, the first and second armatures 18 and 20 are configured and positioned to extend laterally across the first pole piece 14 and second pole piece 16. For example, the first armature 18 is shown positioned proximate to the first ends 14a and 16a of the first and second pole pieces 14 and 16, and the second armature 20 is shown positioned proximate to the second ends 14b and 16b of the first and second pole pieces 14 and 16.

In some cases, the armatures 18 and 20 may also include, at least in part, a ferrous metal. The use of a ferrous metal may help create an electromagnetic force between the armatures 18 and 20 and the pole pieces 14 and 16. In some cases, the armatures 18 and may be configured to pivot relative to the first and/or second pole pieces 14 and 16. For example, and in one illustrative embodiment, the first and second armatures 18 and 20 may be mounted such that they pivot about the second pole piece 16. In another illustrative embodiment, the first and second armatures 18 and 20 may be mounted such that they pivot about the first pole piece 14 (see, for example, FIGS. 5A-5B). It is contemplated that the first and second armature 18 and 20 may be mounted to pivot relative to the same pole piece 14 or 16, or, the first and second armatures 18 and 20 may be mounted to pivot relative to opposite pole pieces 14 and 16, depending on the application. In some embodiments, the first and second armatures 18 and 20 may be mounted to pivot or otherwise move independent of the first and second pole pieces 14 and 16, if desired.

In FIG. 1, when a sufficient current is provided to coil 12, the coil and the first pole piece 14 form an electromagnet. The first and second armatures 18 and 20 may be positioned in the magnetic field of the electromagnet. In some cases, a first air gap (not explicitly shown in FIG. 1) may be provided between the first armature 18 and the first end 14a of the first pole piece 14, and a second air gap (not explicitly shown in FIG. 1) may be provided between the second armature 20 and the second end 14b of the first pole piece 14. The size of the air gaps may be configured to correlate with the needed movement of the armatures 18 and 20 to open and close valves 22 and 24, respectively. In one example, the air gaps may be sized to be about 0.25 millimeters, but it is contemplated that any suitable air gap may be used, as desired.

In some cases, the solenoid 11 may include one or more springs or other biasing mechanisms (see, for example, FIG. 6) for biasing the first and second armatures 18 and 20 into a first position. In some cases, the one or more springs may engage the armatures 18 and 20 and bias the armatures 18 and 20 away from the first pole piece 14, while in other cases, the one or more springs may engage the armatures 18 and 20 and bias the armatures 18 and 20 away from the second pole piece 14.

In one example, the one or more springs or other biasing mechanisms may be positioned in or near the air gaps between the armatures 18 and 20 and the first pole piece 14. However, it is contemplated that the one or more springs or other biasing mechanisms may be positioned in any suitable location to bias the armatures 18 and 20, as desired. In some cases, the air gaps and springs may be adapted or otherwise configured so that the armatures 18 and 20 actuate at a specific magnetic force. Likewise, it is contemplated that the air gaps and the springs for the first and second armatures 18 and 20 may be similarly configured so that both armatures 18 and 20 actuate in response to the same or about the same magnetic force. Alternatively, the air gaps and/or spring may be configured differently so that the armatures 18 and 20 actuate in response to different magnetic forces.

In the illustrative embodiment, coil 12 may include a loop of wire wound around a bobbin positioned about at least part of the first pole piece 14. In some cases, the bobbin may be made of plastic or other non-ferrous material, as desired. In one case, the coil 12 may be radially centered on at least part of the first pole piece 14. In other words, the coil 12 may be coaxially disposed about the first pole piece 14. However, it is contemplated that the coil 12 may be provided at any suitable position adjacent to or about the first pole piece 14 or the second pole piece 16, depending on the application.

In some cases, the coil 12 may have a pair of terminals or taps (not shown) coupled to an electronic drive circuit. In some cases, the pair of terminals may include a positive terminal and a negative terminal. In one case, the electronic drive circuit may be part of a controller (not shown) that can provide an appropriate current to the coil 12 based upon a thermostat or other controller signal. However, it is contemplated that the electronic drive circuit may be any suitable circuit that can provide a desired level current to the coil 12.

In operation, and in one illustrative embodiment, the electronic drive circuit may provide an electric current to the coil 12, which then produces a magnetic field at both ends of the first pole piece 14. The magnetic field may cause a magnetic flux to pass across the air gaps that may be between the armatures 18 and 20 and the first pole piece 14. When the magnetic field is sufficiently large, the armatures 18 and 20 may be sufficiently attracted to the first pole piece 14, and then actuate toward the first pole piece thereby closing the air gaps.

In some embodiments, the first armature 18 and the second armature 20 may be mounted such that they are in contact with, or in close proximity to, the second pole piece 16. For example, the armatures 18 and 20 may be mounted such that they pivot about the second pole piece 16, while remaining in contact with, or in close proximity to, the second pole piece 16. When so provided, the first armature 18 may act to collect the magnetic flux emanating from the first end 14a of the first pole piece 14, and the second pole piece 16 and the second armature 20 may act to provide a closed loop path for the magnetic flux back to the second end 14b of the first pole piece 14. The first armature 18, the second pole piece 16 and the second armature 20 may thus act as a flux concentrator for concentrating the magnetic flux produced by at first pole piece 14 across the air gaps between the first and second armatures 18 and 20 and the ends 14a and 14b of the first pole piece 14.

If the first armature 18 were to actuate before the second armature 20, thereby closing the air gap between the first armature 18 and the first end 14a of the first pole piece 14, the remaining magnetic flux would be focused or concentrated across the remaining air gap between the second armature 20 and the second end 14b of the first pole piece 14. This remaining focused or concentrated magnetic flux may help close the second armature 20. Thus, in some embodiments, the presence of the second pole piece 16 may make the actuation of armatures 18 and 20 more predictable, and may help to actuate both armatures 18 and 20 at similar times, when so desired.

In the illustrative embodiment, electromagnetic valve assembly 10 may include two valves 22 and 24 that may be controlled by the solenoid 11. In some cases, the two valves 22 and 24 may control, at least in part, the flow of gas to a combustion chamber in a gas-fired HVAC appliance. In one illustrative embodiment, the two valves 22 and 24 may be servo values or remote valves that control corresponding larger diaphragm valves. In this example, each valve 22 and 24 may be actuated by a corresponding armature 18 and 20 to modulate the flow of a fluid or gas to the combustion chamber via a diaphragm valve.

It is contemplated that the valves 22 and 24 may be provided in a series arrangement to help control the flow of a gas. Providing the valves 22 and 24 in series may help reduce the risk of gas leakage past the valves because both valves 22 and 24 must fail in order to produce a gas leak. As such, providing two valves in series may provide redundancy, which in some cases, can increase safety.

In other cases, the valves 22 and 24 may be provided in a parallel arrangement. In a parallel arrangement, the gas valves 22 and 24 may be used to, for example, modulate the flow of a fluid or gas. For example, there may be a first flow rate when one of the valves 22 or 24 is open and a relatively larger second flow rate when both valves 22 and 24 are open. In some cases, the valves 22 and 24 may have different sizes, such that there may be a first flow rate when only the smaller of the valves is open, a relatively larger second flow rate when only the larger of the valves is open, and yet a larger third flow rate when both of the valves are open.

Figure 2:
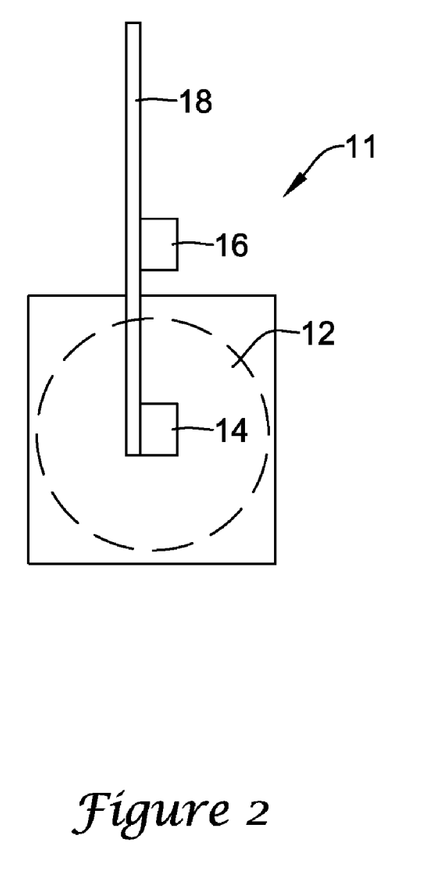
FIG. 2 is a schematic side view of the illustrative dual armature solenoid operator of FIG. 1.

FIG. 2 is an illustrative side view of the dual armature solenoid 11 of FIG. 1. As illustrated, coil 12 may be disposed coaxially about the first pole piece 14, and the second pole piece 16 may be provided parallel with, and spaced from, the first pole piece 14. The armature 18 may be configured to extend laterally across the first pole piece 14 and the second pole piece 16, as shown. In some cases, the armature 18 may extend from the first pole piece 14 to beyond the second pole piece 16 and to the corresponding valve. As illustrated, the armatures 18 may extend adjacent to, and in some cases in contact with, both the first pole piece 14 and the second pole piece 16 when actuated.

In the illustrative embodiment of FIG. 2, the first and second pole pieces 14 and 16 may have a rectangular cross-section. In some cases, a rectangular cross-section may provide a flat surface for the armature 18 to contact. Additionally, in some cases, a rectangular cross-section may provide a discrete point or edge for the armatures 18 to pivot on. However, it is contemplated that first and second pole pieces 14 and 16 may have any suitable shape, as desired.

Figure 3:
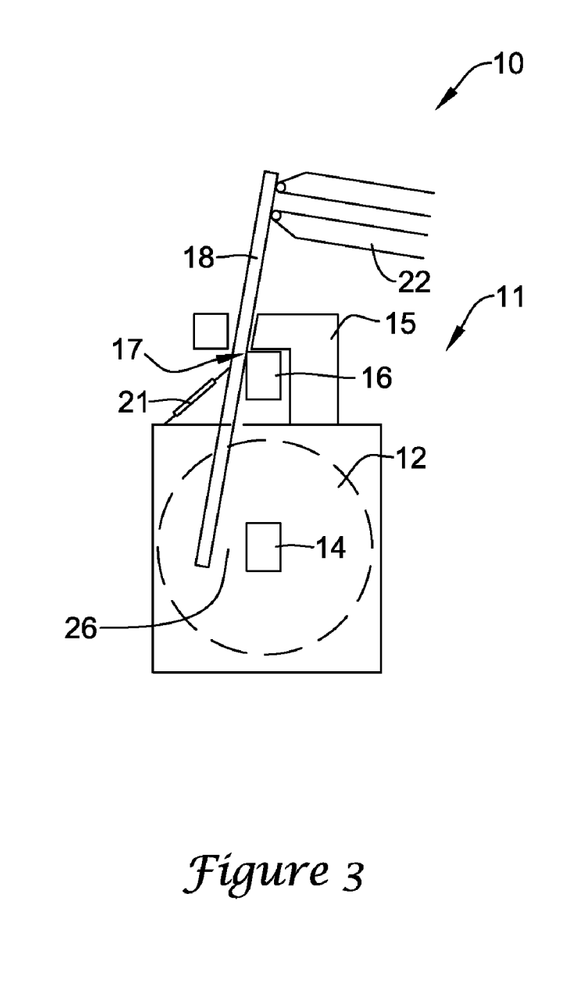
FIG. 3 is a schematic side view of another illustrative dual armature solenoid of FIG. 1.

FIG. 3 is a schematic side view of another illustrative dual armature solenoid 11. This dual armature solenoid 11 may be similar to the embodiments discussed previously, except the dual armature solenoid 11 may include a carrier 15 that provides a pivot point 17 for the armature 18. In some cases, the carrier 15 may be attached to at least a portion of the bobbin of the coil 12, but this is not required. The carrier 15 may help mount and position the armature 18 relative to the valve (not shown) and the first and second pole pieces 14 and 16. In the illustrative embodiment, the pivot point 17 may be positioned to allow the armature to have a sufficient range of motion to open and close the valve as desired. The carrier 15 may also, when desired, mount the armature 18 such that it is in contact with, or in close proximity to, the second pole piece 16, and possibly pivot about an edge of the second pole piece. While carrier 15 is shown explicitly in FIG. 3 for simplicity and clarity, it is contemplated that carrier 15 or a similar carrier structure may be used in conjunction with the other embodiments disclosed herein, if desired.

It is contemplated that the dual armature solenoid 11 may include a spring 21. In some cases, the spring 21 may bias the armature 18 away from the first pole piece 14, and in some case, towards the second pole piece 16. In the illustrative embodiment, spring 21 may have a first end attached to the armature 18 adjacent to the second pole piece 16 and a second end attached to the bobbin of the coil 12. However, it is contemplated that spring 21 may have any suitable position or configuration to bias the armature 18 away from the first pole piece 14, and possible towards the second pole piece 16, as desired. In some cases, two or more springs may be employed.

In some embodiments, it is contemplated that a spring or other biasing mechanism may be configured to bias armature 18 away from the second pole piece 16, and possible towards the first pole piece 14, if desired. In this alternative embodiment, the pivot point 23 may be positioned and sized to allow the armature 18 to open and close a valve while pivoting on or near the first pole piece 14 as shown in, for example, FIGS. 5A and 5B.

Figure 4A:
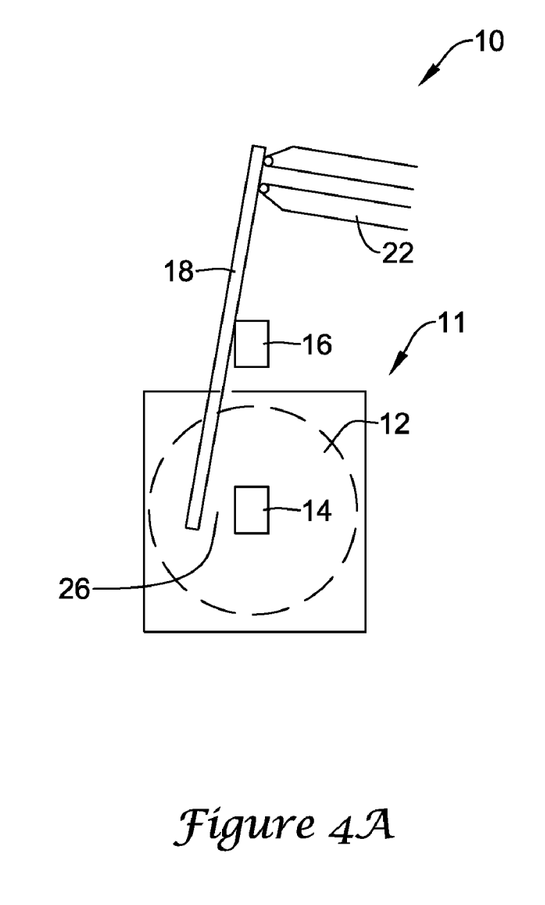
FIGS. 4A and 4B are schematic side views of an illustrative electromagnetic valve assembly in an open position and a closed position.
Figure 4B:
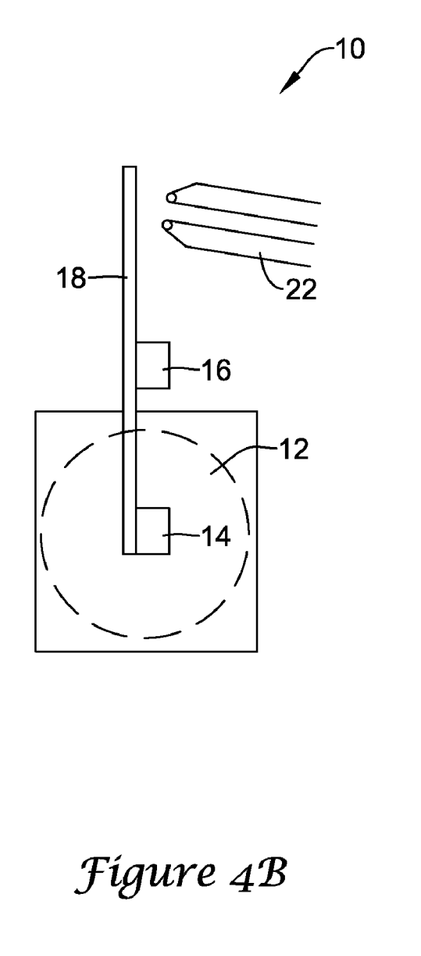

FIG. 4A and FIG. 4B are schematic side views of an illustrative electromagnetic valve assembly in a closed position and an open position, respectively. As described above, the solenoid 11 may include a first armature 18 and a second armature (not shown in FIGS. 4A and 4B). In some cases, the first armature 18 may be movable between a first position (shown in FIG. 4A) and a second position (shown in FIG. 4B). In the first position, the first armature 18 is shown abutting the second pole piece 16 but spaced from the first pole piece 14 by an air gap 26. In the second position, the first armature 18 still abuts the second pole piece 16, but has moved into engagement with the first pole piece 14, thereby closing the air gap 26. In some cases, the first armature 18 may be pivoted relative to the second pole piece 16, as shown. Similar to the first armature 18, the second armature (not shown) may also be movable between a first position (similar to that shown in FIG. 4A) and a second position (similar to that shown in FIG. 4B) in a like manner.

The first armature 18 and the second armature 20 may be positioned to open and close a first valve 22 and a second valve 24 (see FIG. 1). In some cases, when the first and second armatures 18 and 20 are in the first position, the valves 22 and 24 are closed, and when the first and second armatures 18 and 20 are in the second position, the valves 22 and 24 are open.

In this illustrative embodiment, air gap 26 is provided between the armatures 18 and 20 and the first pole piece 14. In some cases, a biasing mechanism (see, for example, FIG. 6) may be provided to bias the armature 18 away from the first pole piece 14 to the first position (FIG. 4A), but this is not required.

During operation, the electromagnetic valve assembly 10 may be in a normally closed position, or in other words, when no current passed through the coil 12, the electromagnetic valve assembly 10, including valves 22 and 24, is closed. When a current is passed through the coil 12, the coil 12 may produce a magnetic field that induces a magnetic force between the first pole piece 14 and the armatures 18 and 20. In some cases, when the magnetic force becomes large enough, the armatures 18 and 20 may be pulled towards the first pole piece 14, thereby actuating the armatures 18 and 20 and opening the valves 22 and 24 (see FIG. 4B). Similarly, when the current through the coil 12 is reduced, the magnetic force between the first pole piece 14 and the armatures 18 and 20 may be reduced so that the armatures 18 and 20 are biased away from the first pole piece 14, thereby closing the valves 22 and 24.

It is contemplated that the dual armature valve assembly 10 may be configured to be normally open rather than normally closed, if desired. In this case, when the armatures 18 and 20 are biased away from the first pole piece 14, the valves 22 and 24 would be positioned to be in an open position, and when the armatures 18 and 20 are actuated, the valves 22 and 24 would be in a closed position.

Figure 5A:
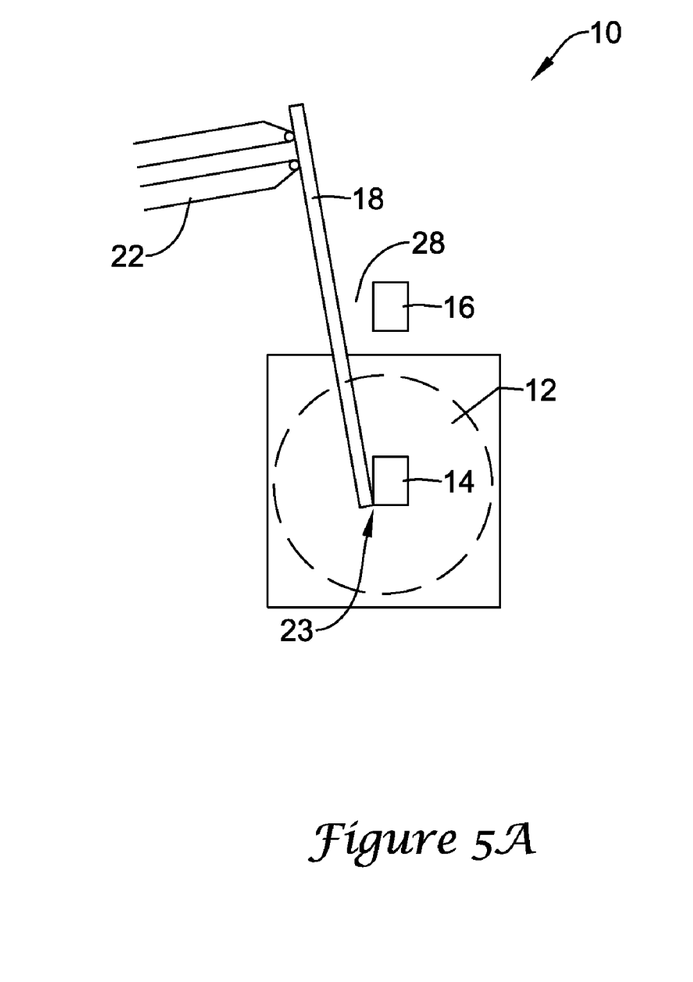
FIGS. 5A and 5B are schematic side views of another illustrative electromagnetic valve assembly in an open position and a closed position.
Figure 5B:
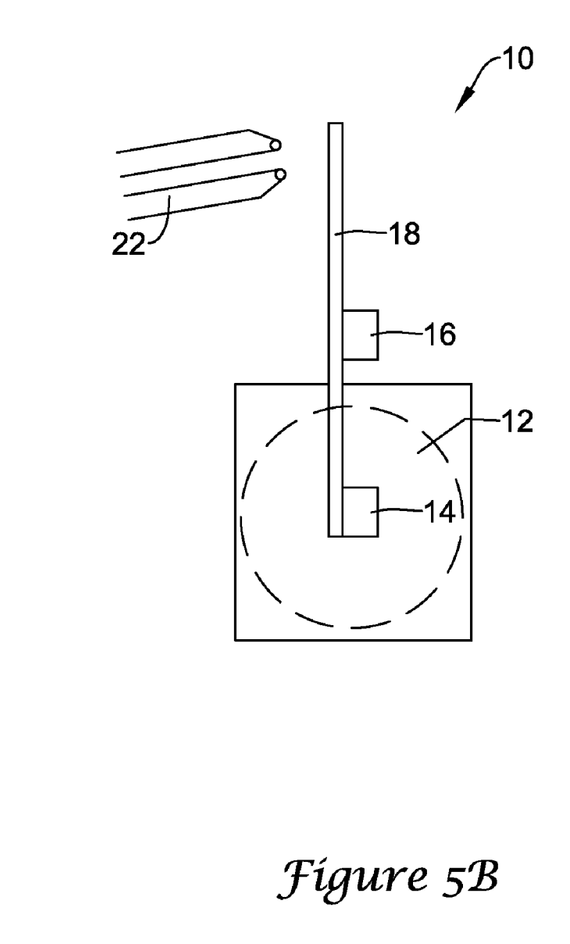

FIG. 5A and FIG. 5B are schematic side views of another illustrative electromagnetic valve assembly 10 in a closed position and an open position, respectively. This embodiment is similar to the embodiment shown in FIG. 3, except that the armature 18 (and armature 20) pivots on or near the first pole piece 14, instead of the second pole piece 16. In FIG. 5A, the illustrative electromagnetic valve assembly is closed and, in FIG. 5B, the electromagnetic valve assembly is open.

As shown, the first armature 18 is movable between a first position (shown in FIG. 5A) and a second position (shown in FIG. 5B). In the first position, the first armature 18 is shown abutting the first pole piece 14 but spaced from the first pole piece 14 by an air gap 28. In the second position, the first armature 18 still abuts the first pole piece 14, but has moved into engagement with the second pole piece 16, thereby closing the air gap 28. In some cases, the first armature 18 may be pivoted relative to the second pole piece 16, as shown. Similar to the first armature 18, the second armature (not shown) may also be movable between a first position (similar to that shown in FIG. 5A) and a second position (similar to that shown in FIG. 5B) in a like manner.

The first armature 18 and the second armature 20 may be positioned to open and close a first valve 22 and a second valve 24. In some cases, when the first and second armatures 18 and 20 are in the first position, the valves 22 and 24 are closed, and when the first and second armatures 18 and 20 are in the second position, the valves 22 and 24 are open.

In this illustrative embodiment, air gap 28 is provided between the armatures 18 and 20 and the second pole piece 16. In some cases, a biasing mechanism (see, for example, FIG. 6) may be provided to bias the armatures 18 and 20 away from the second pole piece 16 to the first position (FIG. 5A), but this is not required.

During operation, the electromagnetic valve assembly 10 may be in a normally closed position, or in other words, when no current passed through the coil 12, the electromagnetic valve assembly 10, including valves 22 and 24, is closed. When a current is passed through the coil 12, the coil 12 may produce a magnetic field that induces a magnetic force between the second pole piece 16 and the armatures 18 and 20. In some cases, when the magnetic force becomes large enough, the armatures 18 and 20 may be pulled towards the second pole piece 16, thereby actuating the armatures 18 and 20 and opening the valves 22 and 24 (see FIG. 5B). Similarly, when the current through the coil 12 is reduced, the magnetic force between the second pole piece 16 and the armatures 18 and 20 may be reduced so that the armatures 18 and 20 are biased away from the second pole piece 16, thereby closing the valves 22 and 24.

It is contemplated that the dual armature valve assembly 10 shown in FIGS. 5A and 5B may be configured to be normally open rather than normally closed, if desired. In this case, when the armatures 18 and 20 are biased away from the second pole piece 16, the valves 22 and 24 would be positioned to be in an open position, and when the armatures 18 and 20 are actuated, the valves 22 and 24 would be in a closed position.

Figure 6:
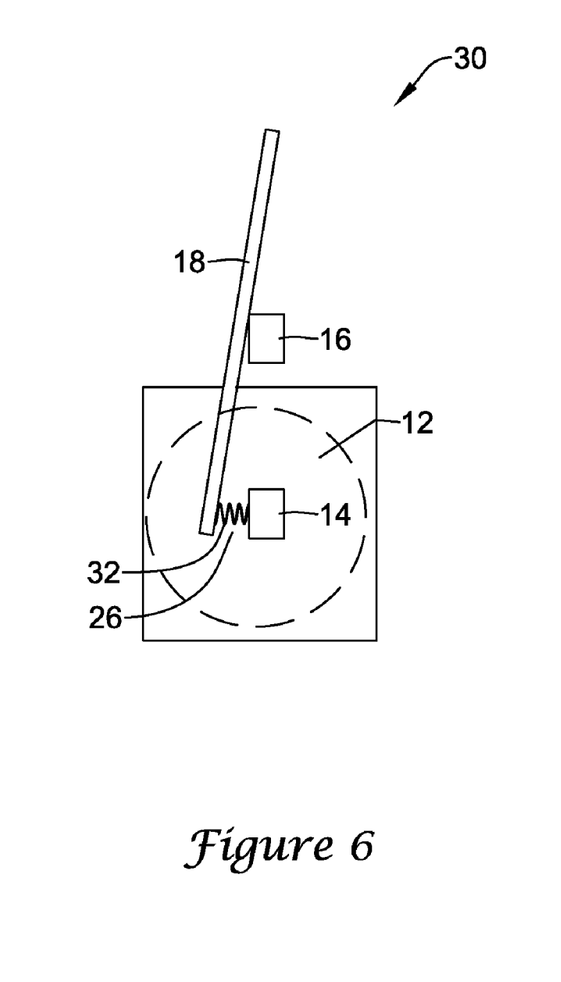
FIG. 6 is a schematic side view of another illustrative embodiment of a dual armature solenoid operator.

FIG. 6 is a schematic side view of another illustrative embodiment of a dual armature solenoid 30. This dual armature solenoid 30 may be similar to the embodiments discussed previously. In FIG. 6, however, the dual armature solenoid 30 shows a spring 32 or other biasing mechanism in or near the air gap 26 for biasing the armature 18 away from first pole piece 14. In the illustrative embodiment, the spring 32 may be provided between the first pole piece 14 and the armature 18, but this is not required. In other embodiments, such as discussed above with reference to FIGS. 5A and 5B, it is contemplated that the spring 32 or other biasing mechanism may be provided between the second pole piece 16 and the armature 18, if desired.

In some cases, the spring 32 or other biasing mechanism may be configured so that the spring force biasing the armature 18 may be overcome at a certain magnetic force, corresponding to a switching point. In some cases, the switching point may be a known or predetermined magnetic force or value. For example, a spring 32 with a higher spring constant may require a greater magnetic force to actuate or switch the armature 18, and thus the corresponding valve 22. In the illustrative embodiment, the spring 32 may be a compression spring, but it is contemplated that any suitable spring or any other biasing mechanism may be used, as desired.

In some cases, both the first armature 18 and the second armature (not shown) may have a spring 32 or other biasing mechanism. However, it is contemplated that only one of the armatures 18 may have a spring 32 or other biasing mechanism. In some cases, the valves 22 and 24 may themselves be biased either open or closed, and thus none of the armatures may be provided with a spring or other biasing mechanism. Additionally, it is contemplated that the first armature 18 and the second armature 20 may have the same size springs 32 or different size springs 32. If the springs 32 are the same size, both armatures 18 may actuate at about the same magnetic force. For different size springs, the armatures 18 may actuate at different magnetic forces.

In some cases, it may be desirable to have the armatures 18 and 20 actuate at different magnetic forces, such as, for example, if the valves 22 and 24 are fluidly connected in a parallel arrangement and multiple flow rates are desired. In such a case, the first armature 18 may be actuated allowing a first, slower flow rate in response to a first smaller current level in the coil. Then, if the current level in the coil is increased, the second armature 20 may be actuated to increase the flow rate to a second higher flow rate. It is contemplated that if more than two armatures and valves are provided in a parallel arrangement, any desired level of resolution to the modulated flow rate may be achieved.

Figure 7:
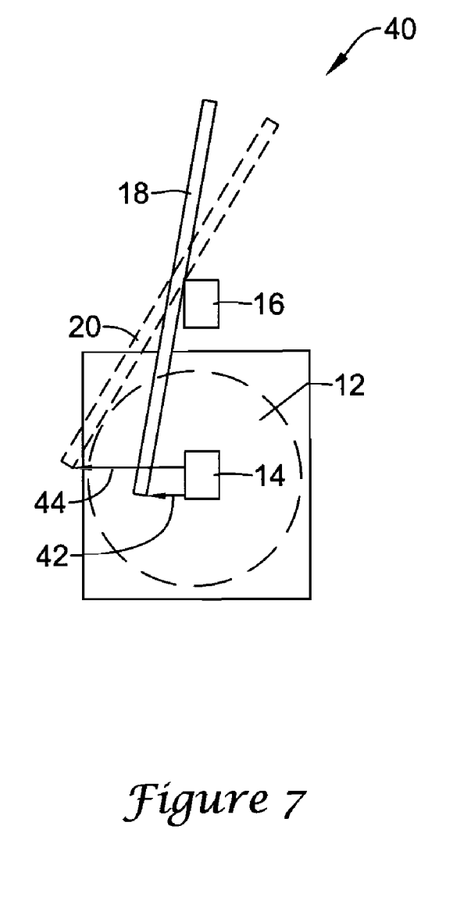
FIG. 7 is a schematic side view of another illustrative embodiment of a dual armature solenoid operator.

FIG. 7 is a schematic side view of another illustrative embodiment of a dual armature solenoid 40. In the illustrative embodiment, the dual armature solenoid 40 may be able to actuate the armatures 18 and 20 at different magnetic forces. As illustrated, the first armature 18 may have a relatively smaller air gap 42 and the second armature 20 may have a relatively larger air gap 44. In this configuration, the first armature 18 may actuate at a relatively smaller magnetic force than the second armature 20. In some cases, this may, for example, help the electromagnet valve assembly 40 modulate the flow of a fluid or gas with multiple flow rates, if desired.

Figure 8:
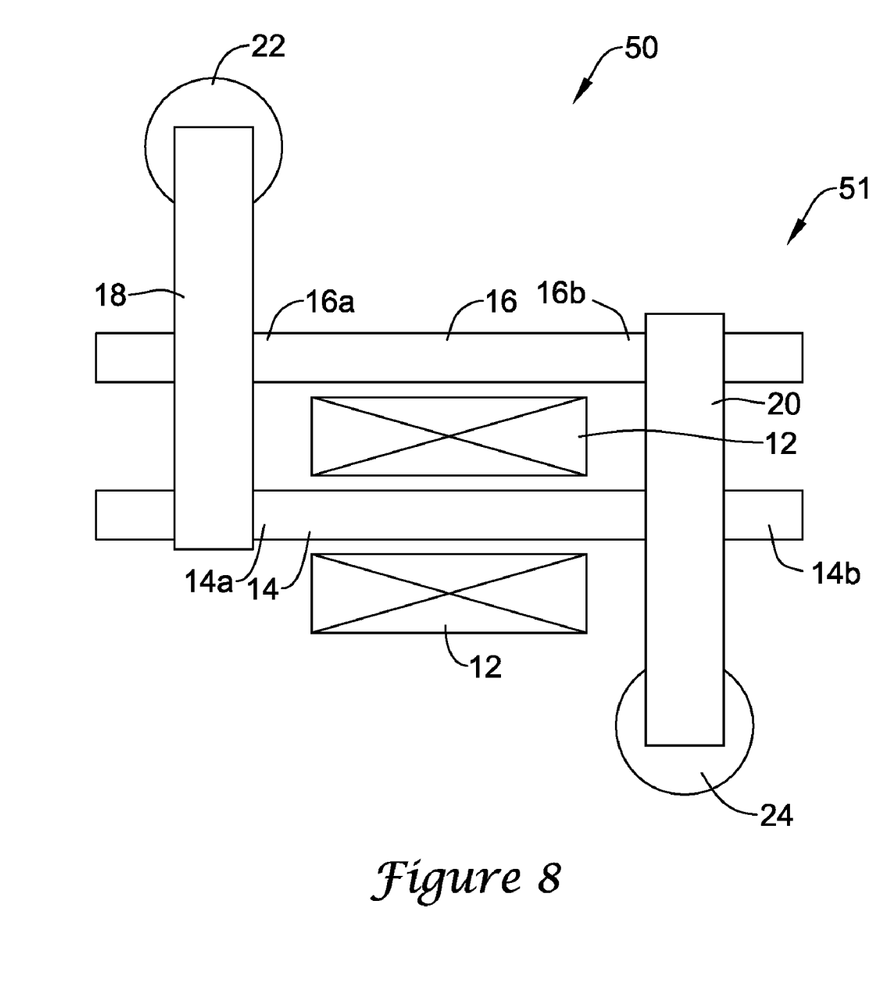
FIG. 8 is a schematic front view of another illustrative embodiment of an electromagnetic valve assembly.

FIG. 8 is a schematic front view of another illustrative embodiment of an electromagnetic valve assembly 50. The illustrative embodiment may be similar to the embodiment of FIG. 1, except that valves 22 and 24 may be positioned on opposite sides of the pole pieces 14 and 16 and the coil 12 so that armatures 18 and 20 may pivot relative to opposite pole pieces. In the illustrative embodiment, the electromagnetic valve assembly 50 may include a coil 12 disposed coaxially about the first pole piece 14, and the second pole piece 16 may be provided parallel with, and spaced from, the first pole piece 14. The armatures 18 and 20 may be configured to extend laterally across the first pole piece 14 and the second pole piece 16, as shown.

In the illustrative embodiment, the armature 18 may extend from the first pole piece 14 to beyond the second pole piece 16 to the corresponding valve 22 and the armature 20 may extend from the second pole piece 16 to beyond the first pole piece 14 to the corresponding valve 24. In this embodiment, the armatures 18 and 20 may be configured to pivot relative to opposite pole pieces. For example, armature 18 may pivot relative to the first pole piece 14 and armature 20 may be pivot relative to the second pole piece 16. In other cases, the dual armature solenoid 51 may be configured to have the armature 18 pivot relative to the second pole piece 16 and the armature 20 pivot relative to the first pole piece 14, as desired.

Figure 9:
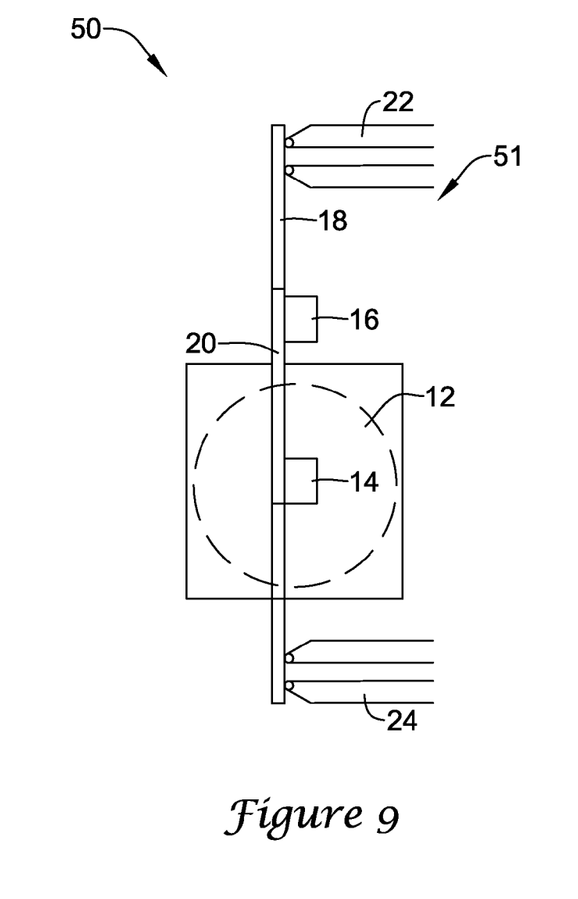
FIG. 9 is a schematic side view of the illustrative dual armature solenoid operator of FIG. 8.

FIG. 9 is a schematic side view of the illustrative electromagnetic valve assembly 50 of FIG. 8. In the illustrative embodiment, the armatures 18 and 20 may be configured to pivot relative to opposite pole pieces. In this embodiment, armature 18 may pivot relative to the first pole piece 14 and armature 20 may be pivot relative to the second pole piece 16. As illustrated, the armatures 18 and 20 may extend adjacent to, and in some cases in contact with, both the first pole piece 14 and the second pole piece 16 when actuated.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A solenoid comprising:
a first pole piece;
a second pole piece separate from the first pole piece, and spaced from the first pole piece;
a coil disposed about at least a portion of the first pole piece the coil producing a magnetic flux in the first pole piece when activated;
a first armature extending across the first pole piece and the spaced second pole piece, the first armature pivoted on or adjacent to the first pole piece or the second pole piece;
a second armature extending across the first pole piece and the spaced second pole piece, the second armature pivoted on or pivoted adjacent to the first pole piece or the second pole piece wherein the first armature, the second pole piece and the second armature each act as part of a flux concentrator for concentrating the magnetic flux produced by the coil in the first pole piece across one or more air gaps.

2. The solenoid of claim 1 further comprising:
a first biasing mechanism adapted to bias the first armature away from whichever one of the first pole piece or the second pole piece that the first armature does not pivot on or adjacent to; and
a second biasing mechanism adapted to bias the second armature away from whichever one of the first pole piece or the second pole piece that the second armature does not pivot on or adjacent to.

3. The solenoid of claim 2 wherein the coil is wound around a bobbin, wherein the first biasing mechanism is attached to the first armature and the bobbin and the second biasing mechanism is attached to the second armature and the bobbin.

4. The solenoid of claim 2 wherein the first armature and the second armature are pivotably moved to work against the biasing mechanisms when a sufficient current is provided through the coil to produce a magnetic force large enough to overcome the biasing force of the biasing mechanisms.

5. The solenoid of claim 1 wherein the first armature can be actuated to open and close a first valve, and the second armature can be actuated to open and close a second valve.

6. The solenoid of claim 5 wherein the first and second valves are pneumatic valves.

7. The solenoid of claim 1 wherein the first armature and the second armature are positioned on opposite sides of the coil.

8. The solenoid of claim 1 wherein the first pole piece is positioned parallel to the second pole piece.

9. The solenoid of claim 1 wherein the one or more air gaps are between the first armature and one or more of the first pole piece and the second pole piece, and/or between the second armature and one or more of the first pole piece and the second pole piece.

10. An electromagnetic valve assembly comprising:
a first armature that can open and close a first valve;
a second armature that can open and close a second valve;
a first pole piece provided between the first armature and the second armature;
a second pole piece separate from the first pole piece, and spaced from the first pole piece;
a first biasing mechanism for biasing the first armature away from the first pole piece;
a second biasing mechanism for biasing the second armature away from the first pole piece;
a coil coaxially disposed about the first pole piece;
wherein the first armature engages the second pole piece and pivots, and wherein the second armature engages the second pole piece and pivots; and
wherein the coil induces a magnetic force in the first pole piece to pivot the first and second armatures against the first and second biasing mechanisms.

* * * * *